United States Patent [19]

Lass

[11] 4,105,490

[45] Aug. 8, 1978

[54] DRY WALL TAPING MACHINE HAVING AN IMPROVED DRY WALL CEMENT DISPENSING BOX

[75] Inventor: Harold M. Lass, San Jose, Calif.

[73] Assignee: Corban Industries, Inc., San Jose, Calif.

[21] Appl. No.: 739,517

[22] Filed: Nov. 8, 1976

[51] Int. Cl.$^2$ ........................ B32B 31/00; B44C 7/00; B05C 3/02

[52] U.S. Cl. .................................... 156/526; 156/575; 156/577; 118/413; 118/415

[58] Field of Search ............... 156/575, 577, 578, 526; 118/404, 405, DIG. 17, 413, 415

[56] References Cited

U.S. PATENT DOCUMENTS

| | | | |
|---|---|---|---|
| 1,935,060 | 11/1933 | Perkins | 118/413 |
| 2,694,378 | 11/1954 | Schnaible | 156/578 |
| 2,779,307 | 1/1957 | Foresta et al. | 118/413 |
| 3,116,195 | 12/1963 | Lathrop et al. | 156/575 |
| 3,496,909 | 2/1970 | Bennett | 156/578 |
| 3,707,427 | 12/1972 | Erickson | 156/578 |
| 3,880,701 | 4/1975 | Moree | 156/577 |
| 3,980,046 | 9/1976 | Homan | 118/405 |

*Primary Examiner*—Douglas J. Drummond
*Attorney, Agent, or Firm*—Harry E. Aine

[57] ABSTRACT

A hand operated dry wall taping machine includes an elongated tubular main body portion to be held by the operator. A tape applicator head portion is disposed at the end of the machine adjacent the seam being taped. A supply roll of tape is carried from the tubular body. The applicator head includes a dry wall cement dispensing box through which the dry wall tape is fed. Cement is disposed from the box onto the side of the tape which is to face the wall being taped. A pair of tape drive wheels are carried forwardly of the tape dispensing box to engage the marginal side edges of the tape, to press the cement laden tape against the wall and to pull the tape from the supply roll through the applicator head and cement dispensing box. A quick disconnect couples the cement dispensing box and tape drive wheel assembly to the applicator head for ease of removal for cleaning. A slidable cover of the cement dispensing box is adjustable for controlling the thickness of the layer of cement deposited upon the tape. Flexible sheets of Teflon seal the tape entrance slot in the cement dispensing box and the slidable cover to the box to prevent undesired leakage of cement from the dispensing box.

21 Claims, 7 Drawing Figures

DRY WALL TAPING MACHINE HAVING AN IMPROVED DRY WALL CEMENT DISPENSING BOX

BACKGROUND OF THE INVENTION

The present invention relates in general to dry wall taping machines and more particular to such machines which include a pair of tape drive wheels for engaging the tape and pulling it through a cement dispensing box supplied with cement under pressure.

DESCRIPTION OF THE PRIOR ART

Heretofore dry wall taping machines have included elongated body portions to be grasped by the operator, such body portions having an applicator head portion disposed adjacent the wall to be taped. The applicator head included a drive wheel for pulling the tape from a supply roll through a cement dispensing box in the head for applying cement to the side of the tape which is to face the wall. Such a tape machine is disclosed in U.S. Pat. No. 3,116,195 issued Dec. 31, 1963 and U.S. Pat. No. 3,260,638 issued July 12, 1966.

Some of the problems associated with these prior art dry wall taping machines is that cement has a tendency to leak out of the cement dispensing box in the up-tape direction, i.e., toward the supply roll and to spread cement into unwanted portions of the mechanism of the tape machine. If the cement hardens in these locations it is difficult to remove and deleteriously affects operation of the device. Moreover, the machine is relatively difficult to clean and an inordinate amount of the operator's time is spent in cleaning the machine after use.

SUMMARY OF THE PRESENT INVENTION

The principal object of the present invention is the provision of a dry wall taping machine having an improved dry wall cement dispensing arrangement.

In one feature of the present invention, a flexible sealing lip is provided at the tape entrance port in the cement dispensing box, such sealing lip being arranged for pressing against the tape in sealing engagement therewith to prevent flow of the dry wall cement along the tape in the up-tape direction while permitting passage of the tape through the dry wall cement dispensing chamber.

In another feature of the present invention, the sealing lip is flexible and presses against the tape in sealing engagement therewith in response to a positive pressure of the dry wall cement within the cement dispensing chamber.

In another feature of the present invention, the height of a tape exit slot in the cement dispensing chamber is controlled by means of a slidably adjustable cover of the chamber so that the position of a marginal lip of the cover serves to control the thickness and uniformity of the cement layer as dispensed onto the tape.

In another feature of the present invention, a quick disconnect means is provided for quickly disconnecting the dry wall cement dispensing box from the head portion of the dry wall taping machine to facilitate ease of cleaning of the cement dispensing box.

In another feature of the present invention, the cement dispensing box and tape drive wheels are coupled together as a subassembly which is connected to the remaining portion of the tape dispensing machine via the intermediary of a quick disconnect device to facilitate cleaning of the cement dispensing box and tape drive wheel assembly.

In another feature of the present invention, a fluid conduit conducts the dry wall cement to the dry wall cement dispensing chamber for supplying dry wall cement to the chamber and thence to the tape. The conduit is sealed to the tape dispensing box via the intermediary of a quick disconnect means which includes a sealing ring for sealing the joint between the conduit and the cement dispensing chamber.

In another feature of the present invention, a slidably adjustable cover for the cement dispensing box is sealed by means of a flexible flap of material pressing in sealing engagement across the sliding joint between the cover and the remaining portion of the cement dispensing chamber to prevent leakage of cement through the joint.

Other features and advantages of the present invention will become apparent upon a perusal of the following specification taken in connection with the accompanying drawings wherein:

DESCRIPTION OF THE PREFERRED EMBODIMENTS

Figure 1:
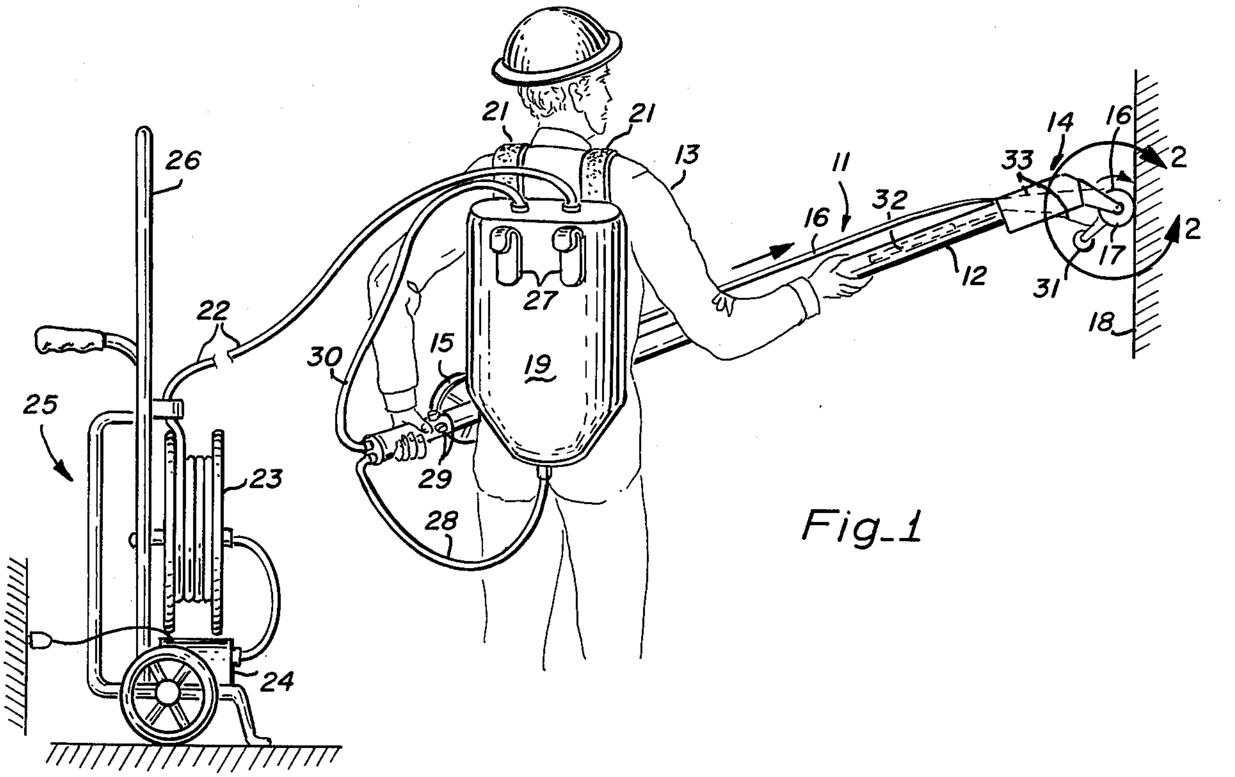
FIG. 1 is a side elevational view of a dry wall taping machine in use.
Figure 2:
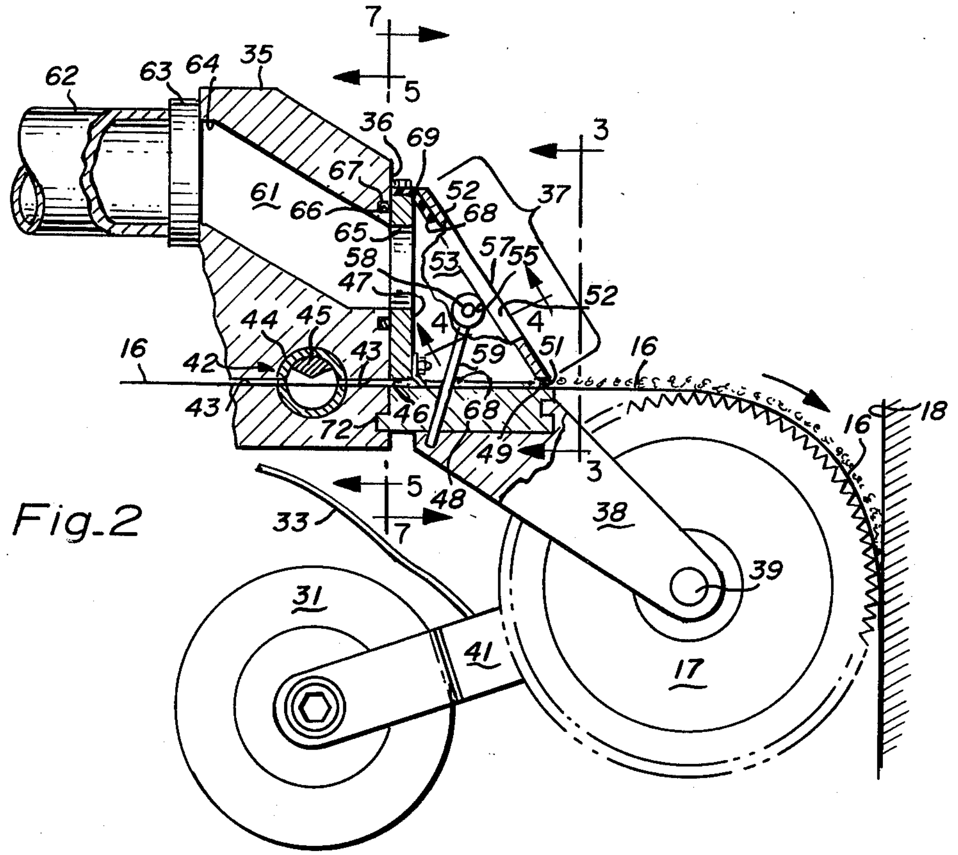
FIG. 2 is an enlarged detail view of a portion of the structure of FIG. 1 delineated by line 2—2 and partly in section.
Figure 3:
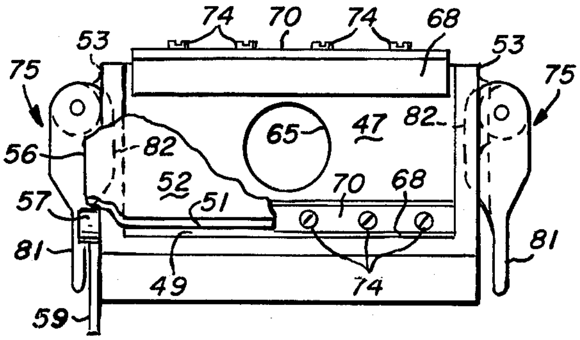
FIG. 3 is a front view of the structure of FIG. 2 taken along line 3—3 in the direction of the arrows and partly broken away.
Figure 4:
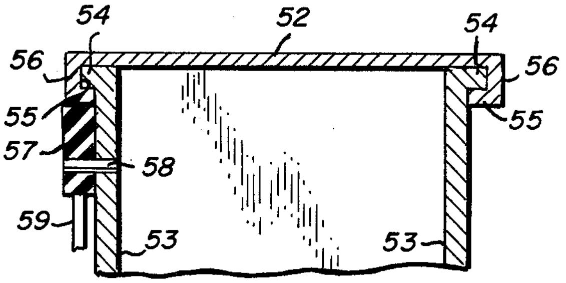
FIG. 4 is a sectional view of the structure of FIG. 2 taken along line 4—4 in the direction of the arrows.
Figure 5:
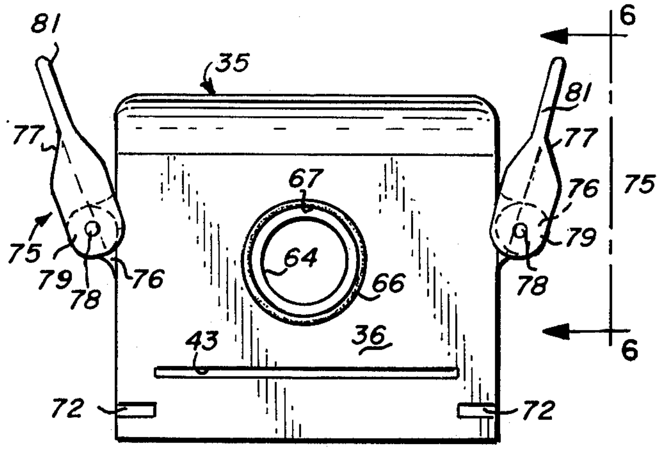
FIG. 5 is a front elevational view of a portion of the structure of FIG. 2 taken along line 5—5 in the direction of the arrows.
Figure 6:
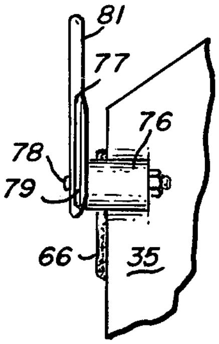
FIG. 6 is a side view of the structure of FIG. 5 taken along line 6—6 in the direction of the arrows.
Figure 7:
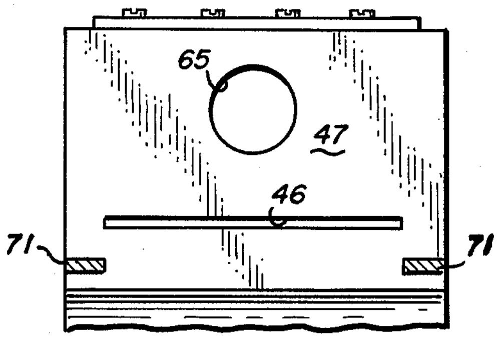
FIG. 7 is a view of a portion of the structure of FIG. 2 taken along line 7—7 in the direction of the arrows.

Referring now to FIG. 1, there is shown a dry wall taping tool 11 of the present invention. More particularly, the dry wall taping machine or tool 11 includes an elongated tubular body or barrel portion 12 to be hand held by the operator 13 so that an applicator head portion 14 of the tool 11 is disposed adjacent a seam which is to be taped between two adjoining sections of dry wall. A supply roll 15 of dry wall tape 16 is carried on a support pivotably affixed to the body or barrel 12. Tape 16 is fed from the roll through the applicator head portion 14 over a pair of tape drive wheels 17 which press the marginal edges of the tape 16 into engagement with the wall 18 and which in so doing serve to pull the tape 16 from the roll 15.

The tape 16 is drawn through a dry wall cement dispenser box portion of the head 14 wherein dry wall cement is dispensed onto the upper surface of the tape so that as the tape is applied to the wall 18, cement is trapped between the tape and the wall. A tape shear, disposed in the applicator head 14 and more fully disclosed below with regard to FIGS. 2-6, shears the tape upon completion of the taping of a given seam. The shear is actuated by the operator when the end of the seam being taped is reached.

The dry wall cement is supplied to the applicator head 14 from a tank 19 carried via shoulder straps 21 from the shoulder of the operator 13. The cement tank 19 contains a supply of dry wall cement and the tank is pressurized to a pressure of 35–40 psi via an air line 22 wound on a spring loaded supply reel 23 and thence connected to an air compressor 24 via a suitable pressure regulator, not shown. The compressor and supply reel are carried from a hand truck 25 which includes a vertically extendable frame member 26 to receive and support the tank, when not in use, via hooks 27 affixed to the tank and hooked over an upper horizontal cross member of the frame 26.

Fluid dry wall cement is supplied from the tank 19 to the taping tool 11 via tubing 28. Suitable hand operated valves 29 are disposed at the outer end of the body 12 for operation by the thumb of the operator for controlling certain functions of the taping tool 11. One valve controls the flow of dry wall cement from the tank 19 to the applicator head 14. Another valve controls air pressure to a pneumatic cylinder for operating the shear and for advancing the leading end of the tape 16. Another valve controls air pressure to a second pneumatic cylinder 32 for operating a cornering wheel 31.

The pneumatically operated cylinder 32 is mechanically coupled to the cornering wheel 31 via a cable 33 such that when the air pressure as supplied to the pneumatic cylinder 32 is relieved a spring mechanically associated with the cornering wheel 39, pivots the cornering wheel into the operating position where it remains so long as the operator depresses the pneumatic control valve for releasing the pressure on the cylinder 32. After the cornering wheel operation is completed, the operator releases the pneumatic control valve and reapplies the pressure to the cylinder 32, thereby withdrawing the cornering wheel via cable 33 against its spring bias. After the tape has been applied to the wall, conventional finishing tools are employed for smoothing the tape 16 and removing the excess dry wall cement.

Referring now to FIGS. 2–7, the tape applicator head 14 and its associated components will be described in greater detail. The applicator head portion 14 includes a block body portion 35, as of aluminum, having a flat transversely directed forward face 36 to detachably receive a dry wall cement dispensing box 37. The tape drive wheels 17 are coupled to the cement dispensing box 37 via a pair of forwardly projecting arms 38, one arm projecting from each side of the box 37. The tape drive wheels 17 are carried from the arms via a transversely directed axle 39. Similarly, the cornering wheel 31 is carried from the axle 39 via an arm 41 mounted to the axle intermediate the drive wheels 17.

A rotary tape shear assembly 42 is transversely mounted within the aluminum housing 35. The tape 16 is fed through a relatively wide and thin passage 43 in the block 35 (see FIG. 5). The rotary shear assembly comprises a tubular outer shear member 44, as of steel, having a pair of diametrically opposed axially directed slots in registration with the tape passageway 43 for passage of the tape through the shear. A shear knife 45 is disposed coaxially within the tubular member 44 and has an intermediate cylindrical sector portion in registration with the tape slot 43 with a pair of cylindrical bearing assemblies, not shown, at opposite ends thereof. A lever, not shown, is actuated by means of a pneumatically operated cylinder for rotating the knife member 45 for shearing the tape at the end of the seam being taped.

The tape passageway 43 is disposed in registration with a similar passageway 46 in the adjoining back wall 47 of the cement dispensing box 37. A bottom wall 48 of the cement dispensing box 37 defines the lower wall of the tape entrance slot 46. Thus, the bottom side of the tape 16 is disposed immediately adjacent and in sliding contact with the inside surface of the lower wall 48 of the cement dispensing box 37. The tape passes out through a tape exit slot 49 defined by the space between the inside surface of the lower wall 48 and the lower lip 51 of a slidable cover 52 closing off and forming the forward side wall of the cement dispensing box 37. The opposite side walls of the cement dispensing box or chamber 37 are formed by triangular end wall members 53.

The end wall members 53, at the forward lip thereof, include a pair of lands 54 which project laterally of the cement dispensing box 37 to serve as a rail which fits within a retaining groove 55 formed in the side lip portions 56 of the cover 52. An eccentric 57, as of Teflon, is pivotably mounted to the outside wall 53 of chamber 37 via pin 58 and a lever 59 is coupled to the eccentric so that by pivoting the eccentric 57 a frictional lock is obtained between the cover and the side wall of the cement dispensing box via the intermediary of the frictional engagement of the periphery of the eccentric 57 with the adjacent lip of the cover 52.

The operator adjusts the height of the tape exit slot 49 by slidably adjusting the position of the cover 52 and then he frictionally locks the cover 52 in the desired position via the eccentric 57.

Dry wall cement 61 is supplied to the cement dispensing box 37 via a conduit which includes a plastic hose portion 62 passing through the barrel 12 and suitable bores in the head 35 and being affixed at the forward end to a nipple 63 which in-turn is coupled to a bore 64 in the head 35. The forward end of the bore 64 is in registration with a bore 65 in the back wall 47 of the cement dispensing box 37. An O-ring 66 is carried within a groove 67 which surrounds bore 64 in the forward face 36 of the applicator block 35.

A pair of flexible plastic sheets, as of 0.015 inch thick tetrafluoroethylene resin, Teflon, 68 are affixed to the back wall 47 of the cement dispensing box 37, one for sealing the slidable joint between the cover 52 and the back wall 47 at 69 and the other for sealing the tape entrance slot 46 so that the dry wall cement as applied to the cement dispensing box 37 under pressure does not travel up the tape through the slot 46. The Teflon sealing flaps 68 are battened to the rear wall 47 of the cement dispensing box 37 via battens 70 held down via screws 74. The inside walls of the box 37 are coated with Teflon for ease of cleaning.

The dry wall cement is supplied to the dispenser box 37 under pressure from the tank 19 via the plastic tubing 62 and bore 64 into the cement dispensing box 37 wherein it is deposited onto the upper face of the tape 16. The deposited cement is scraped by the lip of tape exit slot 49 to define a deposited layer of cement on the upper face of the tape, such layer of cement having a precise uniform thickness as determined by the position of the lower lip 51 of the cover 52 which defines the upper boundary of the tape exit slot 49.

The cement dispensing box 37 is coupled to the forward wall 36 of the applicator body 35 via a pair of rearwardly projecting keys 71 which engage key slots 72 in the face 36 of the applicator head 35. A pair of pivotable latches 75 are carried from opposite sides of the applicator head block 35 via ear portions 76 near the forward face 36 on opposite sides of the block 35. The latches 77 are pivotably affixed to the individual ears 76 via pivot pin 78. The latches 77 include an eccentrically pivoted wedge shaped blade portion 79 which is pivoted inwardly by pressing down on a lever arm portion 81 affixed to the wedge portion 79. The wedge portions 79 are pivoted inwardly into slots 82 in the side walls 53 of the cement dispenser box 37 for wedging the cement dispenser box 37 rearwardly such that the rear wall 47 of the cement dispenser box 37 is pressed into sealing engagement with the sealing O-ring 66.

The dry wall tape dispensing machine 11 is cleaned, after use, by opening the latches 75 and removing the cement dispensing box 37 with the associated tape drive wheels 17 and cornering wheel 31. The cable 33 is disconnected by means of a quick disconnect coupler and the subassembly including the cement dispensing box 37 and the associated wheels are then washed with water and cleaned. For short durations of time a plug may be inserted into the open end of the bore 64 in the face of the head 14 to prevent hardening of the dry wall cement. For longer periods of time, the tank 19 is emptied and cleaned and filled with water and then repressurized and water under pressure is then flushed through the conduit 62 and applicator head for cleaning thereof.

The advantage of the applicator head 14 of the present invention including the quick disconnectable dry wall cement applicator box 37, is that the cement applicator box and associated tape drive wheels 17 and cornering wheel 31 are readily removed for cleaning or replacement if damaged. The sealing flaps 68 prevent leakage of cement from the box 37 while permitting adjustment of the thickness of the deposited layer of dry wall cement and passage of the tape 16 through the box 37 without leakage of dry wall cement in the up-tape direction into the shear assembly 42. The friction lock assembly 57 facilitates adjustment of the thickness of the deposited layer of dry wall cement, whereas the latches 75 and associated key and key slot members 71 and 72 readily facilitate removal and replacement of the cement dispenser box 37.

What is claimed is:

1. In a dry wall taping machine:

main body means to be grasped by the operator for applying dry wall tape from a tape supply over a seam between adjacent sections of dry wall;

said main body means having a tape applicator head portion to be disposed adjacent the seam to be taped for applying dry wall cement to the tape and for applying the cement laden tape to the wall and for severing the tape upon completion of the taping of a seam;

means for feeding tape from a supply thereof through said applicator head portion onto the seam to be taped;

said tape applicator head portion including a dry wall cement dispensing means for dispensing dry wall cement onto the face of the tape which is to face the wall being taped;

said dry wall cement dispensing means including chamber means for containing dry wall cement therein, conduit means for feeding fluid dry wall cement into said chamber means, inlet and outlet tape port means in said chamber means for passage of the tape through said chamber means for dispensing dry wall cement onto the tape, and sealing lip means for pressing against the tape and for sealing said tape inlet port means against flow of the dry wall cement outwardly of said chamber through said tape inlet port means in the up-tape direction while permitting passage of the tape into said chamber means through said sealing lip means; and quick disconnect means for quickly disconnecting said dry wall cement dispensing means from said head portion of said dry wall taping machine.

2. The apparatus of claim 1 wherein said sealing lip means is flexible and disposed adjacent the tape for pressing against the tape in sealing engagement therewith in response to a positive pressure of dry wall cement within said chamber means.

3. The apparatus of claim 2 wherein said flexible sealing means comprises a thin sheet of flexible plastic material.

4. The apparatus of claim 3 wherein said flexible sheet of plastic material is of polytetrafluoroethylene resin.

5. The apparatus of claim 1 wherein said tape exit port means comprises an elongated slot, and including means for adjusting the height of said slot for controlling the thickness of dry wall cement applied to the tape therein.

6. The apparatus of claim 1 wherein said quick disconnect means comprises a latch means for latching said dry wall cement dispensing means to said head portion of said dry wall taping machine.

7. In a dry wall taping machine:

main body means to be grasped by the operator for applying dry wall tape from a tape supply over a seam between adjacent sections of dry wall;

said main body means having a tape applicator head portion to be disposed adjacent the seam to be taped for applying dry wall cement to the tape and for applying the cement laden tape to the wall and for severing the tape upon completion of the taping of a seam;

means for feeding tape from a supply thereof through said applicator head portion onto the seam to be taped;

said tape applicator head portion including a dry wall cement dispensing means for dispensing dry wall cement onto the face of the tape which is to face the wall being taped;

said dry wall cement dispensing means including chamber means for containing dry wall cement therein, conduit means for feeding fluid dry wall cement into said chamber means, inlet and outlet tape port means in said chamber means for passage of the tape through said chamber means for dispensing dry wall cement onto the tape, and sealing lip means for pressing against the tape and for sealing said tape inlet port means against flow of the dry wall cement outwardly of said chamber through said tape inlet port means in the up-tape direction while permitting passage of the tape into said chamber means through said sealing lip means; and wherein said means for feeding dry wall cement into said chamber means includes, dry wall cement inlet port means disposed in fluid communication with a conduit for conducting dry wall cement to said chamber means, and quick disconnect means for quickly disconnecting said dry wall cement inlet port means and said chamber means from said dry wall cement conduit.

8. The apparatus of claim 7 wherein said quick disconnect means includes a sealing ring means for sealing said dry wall cement chamber means to said conduit, and wherein said quick disconnect means includes means for separating said dry wall cement chamber means from the remainder of said head portion at the seal made by said sealing ring means.

9. In a dry wall taping machine:

main body means to be grasped by the operator for applying dry wall tape from a tape supply over a seam between adjacent sections of dry wall;

said main body means having a tape applicator head portion to be disposed adjacent the seam to be taped for applying dry wall cement to the tape and for applying the cement laden tape to the wall and for severing the tape upon completion of the taping of a seam;

means for feeding tape from a supply thereof through said applicator head portion onto the seam to be taped;

said tape applicator head portion including a dry wall cement dispensing means for dispensing dry wall cement onto the face of the tape which is to face the wall being taped;

said dry wall cement dispensing means including chamber means for containing dry wall cement therein, conduit means for feeding fluid dry wall cement into said chamber means, inlet and outlet tape port means in said chamber means for passage of the tape through said chamber means for dispensing dry wall cement onto the tape, and sealing lip means for pressing against the tape and for sealing said tape inlet port means against flow of the dry wall cement outwardly of said chamber through said tape inlet port means in the up-tape direction while permitting passage of the tape into said chamber means through said sealing lip means; and wherein said dry wall cement chamber means includes cover means for slidably closing off and defining one wall of said chamber means, one lip of said cover means defining one marginal edge of said tape exit port means, and means for adjusting the position of said cover means so as to adjust the height of said tape exit port means and the thickness of the dry wall cement as dispensed onto the dry wall tape.

10. The apparatus of claim 9 including second sealing lip means for pressing against and cover means for sealing the joint between said slidable cover means and said chamber means.

11. The apparatus of claim 10 wherein said second sealing lip means is flexible for pressing against said cover means in sealing engagement therewith in response to a positive pressure of the dry wall cement within said chamber means.

12. The apparatus of claim 11 wherein said second flexible sealing lip means comprises a thin sheet of flexible plastic material.

13. The apparatus of claim 12 wherein the flexible sheet of plastic material is polytetrafluoroethylene resin.

14. In a dry wall taping machine:

main body means to be grasped by the operator for applying dry wall tape from a tape supply over a seam between adjacent sections of dry wall;

said main body means having a tape applicator head portion to be disposed adjacent the seam to be taped for applying dry wall cement to the tape and for applying the cement laden tape to the wall and for severing the tape upon completion of the taping of a seam;

means for feeding tape from a supply thereof through said applicator head portion onto the seam to be taped;

said tape applicator head portion including a dry wall cement dispensing means for dispensing dry wall cement onto the face of the tape which is to face the wall being taped; and said dry wall cement dispensing means including chamber means for containing dry wall cement therein, conduit means for feeding dry wall cement into said chamber means, inlet and outlet tape port means in said chamber means for passage of the tape through said chamber means for dispensing dry wall cement onto the tape, cover means for slidably closing off and defining one wall of said chamber means, one lip of said cover means defining one marginal edge of said tape exit port means, and means for adjusting the position of said cover means so as to adjust the height of said tape exit port means and the thickness of the dry wall cement as dispensed onto the dry wall tape.

15. The apparatus of claim 14 including sealing lip means for pressing against said cover means for sealing the joint between said slidable cover means and said chamber means.

16. The apparatus of claim 15 wherein said sealing lip means is flexible for pressing against said cover means in sealing engagement therewith in response to a positive pressure of the dry wall cement within said chamber means.

17. The apparatus of claim 14 including frictional lock means for selectively frictionally locking said slidable cover means in position for determining the height of said tape exit port means.

18. In a dry wall taping machine:

main body means to be grasped by the operator for applying dry wall tape from a tape supply over a seam between adjacent sections of dry wall;

said main body means having a tape applicator head portion to be disposed adjacent the seam to be taped for applying dry wall cement to the tape and for applying the cement laden tape to the wall and for severing the tape upon completion of the taping of a seam;

means for feeding tape from a supply thereof through said applicator head portion onto the seam to be taped;

said tape applicator head portion including a dry wall cement dispensing means for dispensing dry wall cement onto the face of the tape which is to face the wall being taped; and said dry wall cement dispensing means including a chamber means for containing dry wall cement therein, conduit means for feeding dry wall cement into said chamber means, inlet and outlet tape port means in said chamber means for passage of the tape through said chamber means for dispensing dry wall cement onto the tape, and quick disconnect means for quickly disconnecting said dry wall cement dispensing means from the remainder of said head portion of said dry wall taping machine.

19. The apparatus of claim 18 wherein said quick disconnect means includes latch means for latching said dry wall cement dispensing means to said head portion of said dry wall taping machine.

20. The apparatus of claim 18 wherein said quick disconnect means includes a sealing ring means for sealing said dry wall cement dispensing chamber means to said conduit, and wherein said quick disconnect means includes means for separating said dry wall chamber means from said head portion at the seal made by said sealing ring means.

21. The apparatus of claim 18 including tape drive wheel means coupled to said cement dispensing chamber means for disconnection from the remainder of said head portion along with said cement dispensing chamber means for ease of cleaning after use.

* * * * *